United States Patent
Blinick et al.

(10) Patent No.: US 8,136,113 B2
(45) Date of Patent: Mar. 13, 2012

(54) METHOD AND APPARATUS FOR ADJUSTING SLEEP TIME OF FIXED HIGH-PRIORITY THREADS

(75) Inventors: Stephen L. Blinick, Tucson, AZ (US);
Scott A. Brewer, Tucson, AZ (US);
Chiahong Chen, Oro Valley, AZ (US);
Daniel A. Heffley, Tucson, AZ (US);
Radha K. Ramachandran, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 11/613,613

(22) Filed: Dec. 20, 2006

(65) Prior Publication Data

US 2008/0155549 A1     Jun. 26, 2008

(51) Int. Cl.
*G06F 9/46* (2006.01)
*G06F 13/24* (2006.01)
*G06F 9/44* (2006.01)

(52) U.S. Cl. ........ 718/103; 718/100; 718/102; 718/108; 710/260; 712/228

(58) Field of Classification Search .......... None
See application file for complete search history.

(56) References Cited

U.S. PATENT DOCUMENTS

| | | | |
|---|---|---|---|
| 5,908,283 A * | 6/1999 | Huang et al. | 414/801 |
| 6,026,427 A * | 2/2000 | Nishihara et al. | 718/106 |
| 6,120,241 A * | 9/2000 | Huang et al. | 414/801 |
| 6,182,231 B1 * | 1/2001 | Gilgen | 713/324 |
| 6,272,517 B1 | 8/2001 | Yue et al. | |
| 6,286,656 B1 * | 9/2001 | Huang et al. | 198/502.2 |
| 6,757,897 B1 * | 6/2004 | Shi et al. | 718/102 |
| 7,020,877 B2 | 3/2006 | Dailey | |
| 7,111,295 B2 * | 9/2006 | Sachedina et al. | 718/100 |
| 7,213,084 B2 * | 5/2007 | Ogilvie et | 710/22 |
| 7,685,476 B2 * | 3/2010 | Andre et al. | 714/48 |
| 7,895,069 B2 * | 2/2011 | Achtermann et al. | 705/7.12 |
| 2002/0007387 A1 | 1/2002 | Ginsberg | |
| 2005/0076335 A1 * | 4/2005 | Cavage et al. | 718/100 |
| 2006/0161920 A1 * | 7/2006 | An et al. | 718/102 |
| 2006/0195847 A1 * | 8/2006 | Amano et al. | 718/103 |

* cited by examiner

*Primary Examiner* — Jennifer To
*Assistant Examiner* — Caroline H Arcos
(74) *Attorney, Agent, or Firm* — Yudell Isidore Ng Russell PLLC

(57) ABSTRACT

A sleep function capable of putting a fixed high-priority thread to sleep within a time-window is disclosed. After a sleep request has been made by a fixed high-priority thread via the sleep function, a determination is made whether or not the fixed high-priority thread is awoken before a requested sleep duration under the sleep request. If the fixed high-priority thread is awoken before the requested sleep duration, the number of tasks for the fixed high-priority thread to perform is increased in order to delay the start sleep time of the fixed high-priority thread from a point within a first time-window in which the sleep request was made to an end boundary of the first time-window.

10 Claims, 2 Drawing Sheets

METHOD AND APPARATUS FOR ADJUSTING SLEEP TIME OF FIXED HIGH-PRIORITY THREADS

BACKGROUND OF THE INVENTION

1. Technical Field

The present invention relates to multi-thread processing in general, and more particularly, to a method and apparatus for adjusting the sleep time of fixed high-priority threads.

2. Description of Related Art

The UNIX® operating system enables multiple threads to run concurrently in a user space. By default, a thread executing under a user mode typically has a low priority and can be preempted or interrupted at any time by other same or higher priority threads. Thus, in order to implement a real-time application in the user mode, some threads of the real-time application are assigned a high priority on a permanent basis, and those threads are commonly known as fixed high-priority threads.

The liberal usage of fixed high-priority threads can potentially cause low-priority threads to receive only a very small portion of processor time. In order to avoid the continued starvation of low-priority threads, certain UNIX® kernels utilize a sleep function, which implements a series of time-out windows, to put some fixed high-priority threads to sleep on a per request basis. After making a sleep request, a fixed high-priority thread is put to sleep by the sleep function, and will be awoken at the beginning boundary of a time-out window in which the sleep request ends. Low-priority threads can be executed when the fixed high-priority thread is sleeping.

The size of each time-out window implemented by the sleep function is constant, and each time-out window occurs on a periodic schedule. The duration of each sleep request can only be made in multiples of the size of a time-out window. But regardless of its requested sleep duration, a fixed high-priority thread will be awoken at the beginning boundary of a time-out window in which a sleep request ends. In other words, no matter when the wake up time is to occur within a time-out window, the fixed high-priority thread will be awoken at the beginning boundary of the same time-out window. For example, if the size of each time-out window is 10 ms, and a sleep request for a 10 ms duration is made by a fixed high-priority thread at the 7 ms mark of a first time-out window, then the fixed high-priority thread will be awoken at the beginning boundary of the second time-out window. The result is a sleep time of 22 ms instead of the requested 30 ms. As another example, if the size of each time-out window is 10 ms, and a sleep request for a 30 ms duration is made by a fixed high-priority thread at the 8 ms mark of a first time-out window, then the fixed high-priority thread will be awoken at the beginning boundary of the fourth time-out window. The result is a sleep time of 22 ms instead of the requested 30 ms. Thus, when a fixed high-priority thread repeatedly makes sleep requests near the end boundary of a time-out window, the fixed high-priority thread will not receive adequate sleep time such that low-priority threads will be deprived of their execution time.

One solution for the above-mentioned problem is to reduce the size of time-out windows, but it may result in an overall decrease in system performance due to an increase in timer interrupts. Consequently, it would be desirable to provide an improved method for adjusting the sleep time of fixed high-priority threads.

SUMMARY OF THE INVENTION

In accordance with a preferred embodiment of the present invention, a sleep function capable of putting a fixed high-priority thread to sleep within a time-window is provided. After a sleep request has been made by a fixed high-priority thread via the sleep function, a determination is made whether or not the fixed high-priority thread is awoken before a requested sleep duration under the sleep request. If the fixed high-priority thread has been awoken before the requested sleep duration, the number of tasks for the fixed high-priority thread to perform is increased in order to delay the starting sleep time of the fixed high-priority thread from a point within a first time-window in which the sleep request was made to an end boundary of the first time-window.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
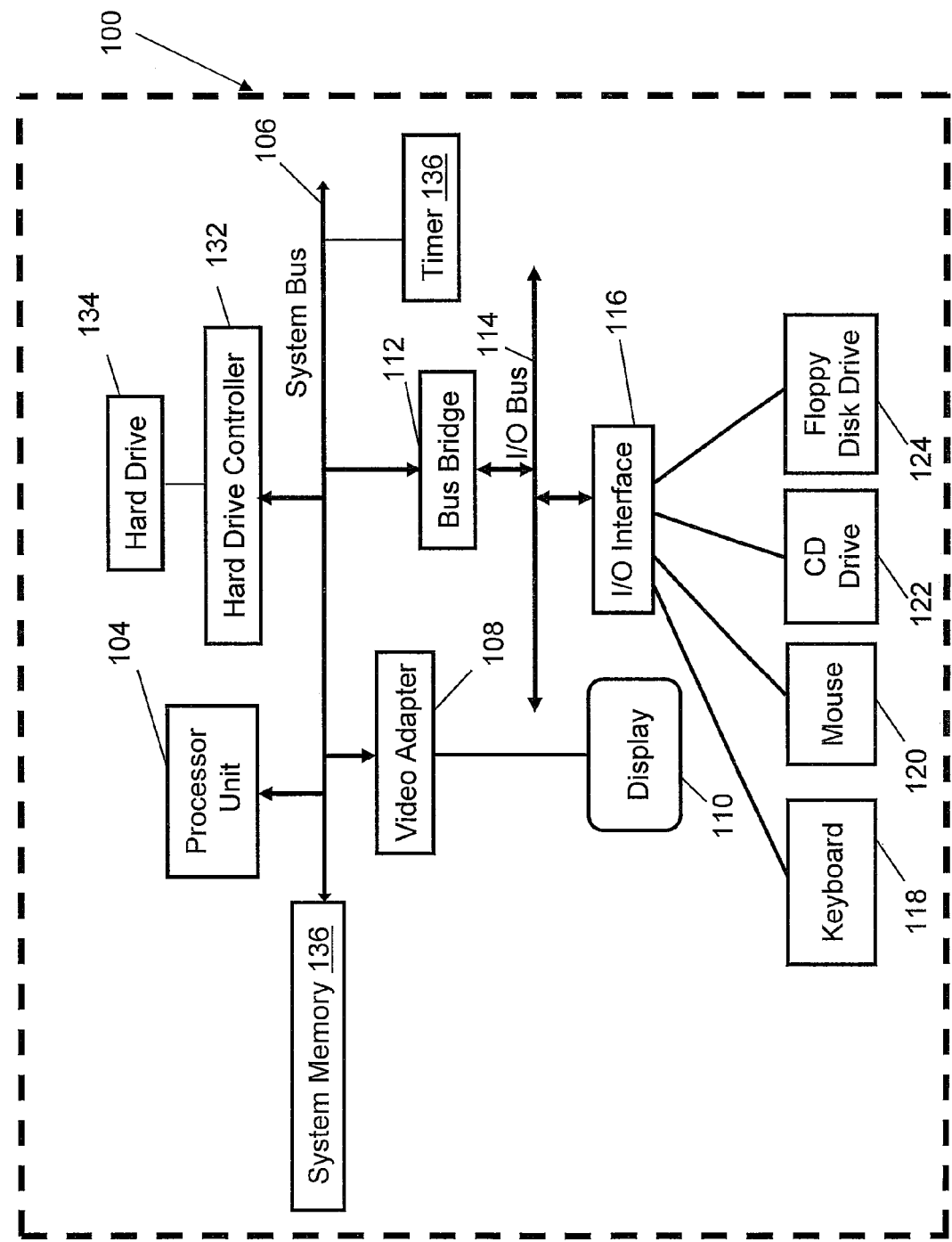
FIG. 1 is a block diagram of a computer system in which a preferred embodiment of the present invention is incorporated.

Referring now to the drawings, and specifically to FIG. 1, there is depicted a block diagram of a computer system in which a preferred embodiment of the present invention is incorporated. As shown, a computer 100 includes a processor 104 and a system memory 136, both coupled to a system bus 106. Computer 100 also includes a hard drive controller 132, a video adapter 108, a bus bridge 112, a timer 136 and a network interface 130, all coupled to system bus 106. Hard drive controller 132 controls a hard drive 134. Video adapter 108 drives a display 110. Bus bridge 112 is coupled to an input/output (I/O) interface 116 via an I/O bus 114. I/O interface 116 affords communications with various I/O devices, such as a keyboard 118, a mouse 120, a compact disc drive 122, and a floppy disk drive 124.

Figure 2:
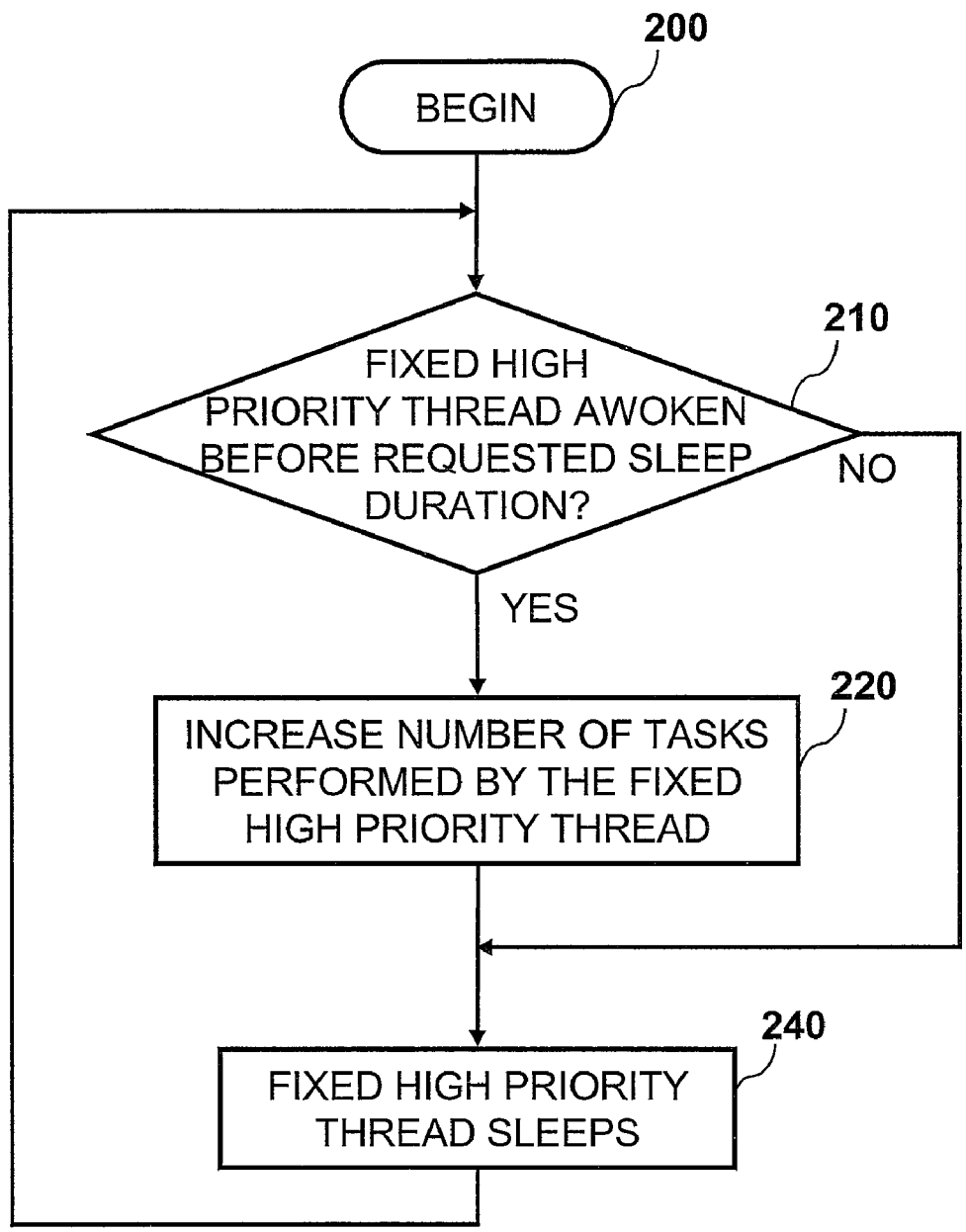
FIG. 2 is a high-level logic flow diagram of a method for adjusting the sleep time of a fixed high-priority thread, in accordance with a preferred embodiment of the invention.

With reference now to FIG. 2, there is depicted a high-level logic flow diagram of a method for adjusting the sleep time of a fixed high-priority thread, in accordance with a preferred embodiment of the present invention. Starting at block 200, a determination is made by a sleep utility whether or not a fixed high-priority thread has been awoken before its requested sleep duration has passed, as shown in block 210. If the sleep duration of the fixed high-priority thread has not been cut short, the process returns to block 210 to continue monitoring the sleep time of the fixed high-priority thread.

If the fixed high-priority thread has been awoken before its requested sleep duration has passed, the number of tasks performed by the fixed high-priority thread is increased by the sleep function, as shown in block 220. Additional tasks are added to the fixed high-priority thread in order to increase the execution time of the fixed high-priority thread. Additional tasks may include other high priority work that was pending but would have been delayed until after the sleep.

The sleep function limits the number of additional tasks such that the additional tasks correspond to an execution time less than or equal to the standard time-window resolution of an operating system (e.g., 10 milliseconds for UNIX®) in order to shift the sleep window. It is most preferable to add just enough additional task to a fixed high-priority thread such that the fixed high-priority thread begins its sleep cycle at the beginning boundary of a time-out window provided by the sleep function. Since the sleep cycle begins at the beginning boundary of a time-out window, it will also end at the beginning boundary of a different time-out window so the fixed high-priority thread receives the entire duration of its sleep request. However, if additional task cannot be adjusted such that a sleep cycle starts at exactly the beginning boundary of a time-out window, additional task should be added to allow the sleep cycle to start immediately after the beginning boundary of a time-out window.

Next, the sleep function causes the fixed high-priority thread to sleep, thereby enabling low-priority threads to receive processor time, as depicted in block 240. The determination can be performed by an application program within a system memory or by a kernel within an operating system. A favorable sleep duration is defined as enabling a fixed high-priority thread to sleep for the entire length of its requested time duration in order to provide low-priority threads some execution time without adversely impacting the system performance corresponding to the fixed high-priority thread. If a favorable sleep duration has not been reached, the process returns to block 220 to increase the number of tasks to be performed by the fixed high-priority thread. The process returns to block 210 to continue monitoring the sleep time of the fixed high-priority thread.

As has been described, the present invention provides a method for adjusting the sleep time of fixed high-priority threads. The present invention increases system performance by monitoring the execution time of threads and adding tasks to specific fixed high-priority threads to adjust their sleep times. As a result, the efficiency of fixed high-priority threads is increased while additional execution time can be provided to lower-priority threads.

While an illustrative embodiment of the present invention has been described in the context of a fully functional computer system with installed software, those skilled in the art will appreciate that the software aspects of an illustrative embodiment of the present invention are capable of being distributed as a computer program product in a variety of recordable type media such as floppy disks, hard drives, and compact discs.

While the invention has been particularly shown and described with reference to a preferred embodiment, it will be understood by those skilled in the art that various changes in form and detail may be made therein without departing from the spirit and scope of the invention.

What is claimed is:

1. A method for adjusting the sleep time of fixed high-priority threads, said method comprising:
    providing a sleep function capable of putting a fixed high-priority thread to sleep within a time-window, during which low-priority threads can be executed;
    after a sleep request has been made by a fixed high-priority thread via said sleep function, determining whether or not said fixed high-priority thread is awoken before a requested sleep duration under said sleep request;
    in a determination that said fixed high-priority thread is awoken before a requested sleep duration under said sleep request, increasing a number of tasks for said fixed high-priority thread to perform in order to delay a start sleep time of said fixed high-priority thread from a point within said time-window in which said sleep request was made to an end boundary of said time-window.

2. The method of claim 1, wherein said determining is performed by an application program.

3. The method of claim 1, wherein said determining is performed by a kernel.

4. The method of claim 1, wherein said increasing further includes increasing a number of tasks for said fixed high-priority thread to perform in order to delay said start sleep time of said fixed high-priority thread from said time-window in which said sleep request was made to a time-window associated with a next sleep request.

5. The method of claim 1, wherein a time duration for performing said number of tasks is less than or equal to a standard kernel timer resolution.

6. A computer recordable medium having a computer program product for adjusting the sleep time of fixed high-priority threads, said computer recordable medium comprising:
    program code means for providing a sleep function capable of putting a fixed high-priority thread to sleep within a time-window, during which low-priority threads can be executed;
    program code means for, after a sleep request has been made by a fixed high-priority thread via said sleep function, determining whether or not said fixed high-priority thread is awoken before a requested sleep duration under said sleep request;
    program code means for, in a determination that said fixed high-priority thread is awoken before a requested sleep duration under said sleep request, increasing a number of tasks for said fixed high-priority thread to perform in order to delay a start sleep time of said fixed high-priority thread from a point within a first time-window in which said sleep request was made to an end boundary of said first time-window.

7. The computer recordable medium of claim 6, wherein said program code means for determining is performed by an application program.

8. The computer recordable medium of claim 6, wherein said program code means for determining is performed by a kernel.

9. The computer recordable medium of claim 6, wherein said program code means for increasing further includes program code means for increasing a number of tasks for said fixed high-priority thread to perform in order to delay said start sleep time of said fixed high-priority thread from said time-window in which said sleep request was made to a time-window associated with a next sleep request.

10. The computer recordable medium of claim 6, wherein a time duration for performing said number of tasks is less than or equal to a standard kernel timer resolution.

* * * * *